United States Patent
Cho et al.

(10) Patent No.: US 11,043,231 B2
(45) Date of Patent: *Jun. 22, 2021

(54) SPEECH ENHANCEMENT METHOD AND APPARATUS FOR SAME

(71) Applicant: SAMSUNG ELECTRONICS CO., LTD., Suwon-si (KR)

(72) Inventors: Jae-youn Cho, Suwon-si (KR); Weiwei Cui, Suwon-si (KR); Seung-yeol Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,813

(22) Filed: Nov. 22, 2019

(65) Prior Publication Data

US 2020/0098385 A1     Mar. 26, 2020

Related U.S. Application Data

(63) Continuation of application No. 16/287,749, filed on Feb. 27, 2019, now Pat. No. 10,529,360, which is a (Continued)

(30) Foreign Application Priority Data

May 26, 2014    (KR) .................. 10-2014-0063112

(51) Int. Cl.
    *G10L 25/00*      (2013.01)
    *G10L 25/78*      (2013.01)
    (Continued)

(52) U.S. Cl.
    CPC .............. *G10L 25/78* (2013.01); *G10L 15/25* (2013.01); *G10L 21/0208* (2013.01);
    (Continued)

(58) Field of Classification Search
    None
    See application file for complete search history.

(56) References Cited

U.S. PATENT DOCUMENTS

| | | | |
|---|---|---|---|
| 6,567,775 B1 | 5/2003 | Maali et al. | |
| 6,577,333 B2 | 6/2003 | Tai et al. | |
| 6,754,373 B1 | 6/2004 | de Cuetos et al. | |
| 7,174,022 B1 | 2/2007 | Zhang et al. | |

(Continued)

FOREIGN PATENT DOCUMENTS

| | | |
|---|---|---|
| CN | 1591568 A | 3/2005 |
| CN | 101853667 A | 10/2010 |

(Continued)

OTHER PUBLICATIONS

Communication dated Feb. 21, 2020, issued by the State Intellectual Property Office of P.R. China in counterpart Chinese Application No. 201480044082.8.

(Continued)

*Primary Examiner* — Edgar X Guerra-Erazo
(74) *Attorney, Agent, or Firm* — Sughrue Mion, PLLC

(57) ABSTRACT

A speech enhancement method is provided. The speech enhancement method includes: estimating a direction of a speaker by using an input signal, generating direction information indicating the estimated direction, detecting speech of a speaker based on a result of the estimating the direction, and enhancing the speech of the speaker by using the direction information based on a result of the detecting the speech.

5 Claims, 9 Drawing Sheets

Related U.S. Application Data continuation of application No. 14/895,808, filed as application No. PCT/KR2014/004840 on May 30, 2014, now Pat. No. 10,431,241.

(60) Provisional application No. 61/875,200, filed on Sep. 9, 2013, provisional application No. 61/830,310, filed on Jun. 3, 2013.

(51) Int. Cl.
  *G10L 21/0208* (2013.01)
  *G10L 15/25* (2013.01)
  *G10L 21/0216* (2013.01)
  *H04R 1/32* (2006.01)

(52) U.S. Cl.
  CPC .......... *G10L 21/0216* (2013.01); *H04R 1/326* (2013.01); *G10L 2021/02166* (2013.01)

(56) References Cited

U.S. PATENT DOCUMENTS

| | | | |
|---|---|---|---|
| 7,305,095 B2 | 12/2007 | Rui | |
| 7,499,686 B2 | 3/2009 | Sinclair et al. | |
| 8,068,619 B2 | 11/2011 | Zhang et al. | |
| 8,175,291 B2* | 5/2012 | Chan | G10L 21/0208 381/94.7 |
| 8,238,593 B2* | 8/2012 | Bisgaard | H04R 3/005 381/313 |
| 8,275,148 B2 | 9/2012 | Li et al. | |
| 8,311,817 B2 | 11/2012 | Murgia et al. | |
| 8,335,324 B2 | 12/2012 | Zhang et al. | |
| 8,351,617 B2 | 1/2013 | Zhang et al. | |
| 8,583,428 B2 | 11/2013 | Tashev et al. | |
| 8,812,309 B2 | 8/2014 | Ramakrishnan et al. | |
| 9,431,029 B2 | 8/2016 | Yook et al. | |
| 9,813,808 B1 | 11/2017 | Yang | |
| 10,250,975 B1 | 4/2019 | Yang | |
| 2003/0069727 A1 | 4/2003 | Krasny et al. | |
| 2007/0038442 A1 | 2/2007 | Visser et al. | |
| 2007/0038448 A1 | 2/2007 | Sherony | |
| 2008/0270131 A1 | 10/2008 | Fukuda et al. | |
| 2009/0018831 A1 | 1/2009 | Morita | |
| 2009/0076815 A1 | 3/2009 | Ichikawa et al. | |
| 2009/0106021 A1 | 4/2009 | Zurek et al. | |
| 2009/0238377 A1 | 9/2009 | Ramakrishnan et al. | |
| 2010/0098266 A1 | 4/2010 | Mukund et al. | |
| 2011/0103626 A1* | 5/2011 | Bisgaard | H04R 3/005 381/313 |
| 2011/0144988 A1 | 6/2011 | Choi et al. | |
| 2011/0208520 A1 | 8/2011 | Lee | |
| 2011/0307251 A1 | 12/2011 | Tashev et al. | |
| 2012/0078624 A1 | 3/2012 | Yook et al. | |
| 2013/0060571 A1 | 3/2013 | Soemo et al. | |
| 2013/0073283 A1 | 3/2013 | Yamabe | |
| 2014/0025374 A1 | 1/2014 | Lou | |
| 2014/0153742 A1 | 6/2014 | Hershey et al. | |
| 2014/0278394 A1 | 9/2014 | Bastyr et al. | |

FOREIGN PATENT DOCUMENTS

| | | |
|---|---|---|
| CN | 102969002 A | 3/2013 |
| CN | 103000184 A | 3/2013 |
| EP | 0901267 A2 | 3/1999 |
| EP | 1 503 368 A1 | 2/2005 |
| KR | 10-2010-0098104 A | 9/2010 |
| KR | 10-1041039 B1 | 6/2011 |
| KR | 10-1060183 B1 | 8/2011 |

OTHER PUBLICATIONS

Communication dated Apr. 23, 2019 issued by the State Intellectual Property Office of P.R. China in counterpart Chinese Application No. 201480044082.8.

Davis A et al: "A Subband Space Constrained Beamformer Incorporating Voice Activity Detection" 2005 IEEE International Conference on Acoustics, Speech, and Signal Processing—Mar. 18-23, 2005—Philadelphia, PA, USA, IEEE, Piscataway, NJ, vol. 3, Mar. 18, 2005 (Mar. 18, 2005), pp. 65-68, XP010792330 (4 pages total).

Communication dated Oct. 8, 2018, issued by the State Intellectual Property Office of the P.R.C. In counterpart Chinese Application No. 201480044082.8.

Written Opinion dated Sep. 9, 2014, issued by the International Searching Authority in counterpart International Patent Application No. PCT/KR2014/004840 (PCT/IB/373 & PCT/ISA/237).

Gannot, et al."Signal Enhancement Using Beamforming and Nonstationarity with Applications to Speech" IEEE Transactions on Signal Processing, vol. 49, Aug. 2001, pp. 1614-1626.

Hendricks, et al., "MMSE Based Noise PSD Tracking with Low Complexity", International Conference on Acoustics, Speech and Signal Processing, 2010, pp. 4266-4269.

Benesty, et al., "Time-domain noise reduction based on an orthogonal decomposition for desired signal extraction", Acoustical Society of America, Jul. 2012, pp. 452-464.

Bub U et al: "Knowing Who to Listen to in Speech Recognition: Visually Guided Beamforming", 1995 International Conference on Acoustics, Speech, and Signal Processing; May 9-12, 1995; Detroit, MI, USA, IEEE, New York, NY, USA, vol. 1, May 9, 1995 (May 9, 1995), pp. 848-851, XP010625366 (4 pages total).

Communication dated Jan. 2, 2017, issued by the European Patent Office in counterpart European Application No. 14807150.9.

Habets, et al., "Multi-Microphone Noise Reduction Using Interchannel and interframe Correlations", International Conference on Acoustics, Speech and Signal Processing, 2012, pp. 305-308.

Griffiths, et al., "An Alternative Approach to Linearly Constrained Adaptive Beamforming", IEEE Transactions on Antennas and Propagation, vol. AP-30, Jan. 1982, pp. 27-34.

Zhang, et al., "Why does Phat work well in Low Noise, Reverberative Enviornments?" International Conference on Acoustics, Speech and Signal Processing, 2008, pp. 2565-2568.

Jeub, et al., "Noise Reduction for Dual-Microphone Mobile Phones Exploiting Power Level Differences", International Conference on Acoustics, Speech and Signal Processing, 2012, pp. 1693-1696.

Benesty, et al., "A single Channel Noise Reduction MVDR Filter", International Conference on Acoustics, Speech and Signal Processing, 2011, pp. 273-276.

Search Report dated Sep. 9, 2014, issued by the International Searching Authority in counterpart International Patent Application No. PCT/KR2014/004840 (PCT/ISA/210).

Welch, P. "The Use of Fast Fourier Transform for the Estimationof Power Spectra: A Method Based on Time Averaging Over Short, Modified Periodograms", IEEE Transactions on Audio and Electroacoustics, vol. AU-15, Jun. 1967, pp. 70-73.

Communication dated Dec. 20, 2018 issued by the Indian Patent Office in counterpart Indian Application No. 3594/MUMNP/2015.

Erzin, E.; Yemez, Y.; Tekalp, A.M.; Ercil, A.; Erdogan, H.; Abut, H., "Multimodal person recognition for human-vehicle interaction," MultiMedia, IEEE, vol. 13, No. 2, pp. 18-31, Apr.-Jun. 2006.

I. Hara et al., "Robust speech interface based on audio and video information fusion for humanoid HRP-2," IROS-2004. pp. 2404-2410.

B. Chen, M. Meguro, and M. Kaneko. "Probabilistic Integration of Audiovisual Information to Localize Sound Source in Human-Robot Interaction". Proceedings of the 2003 International Workshop on Robot and Human Interactive Communication, 2003.

Koldovsky, et al., "Noise Reduction in Dual-Microphone Mobile Phones Using a Bank of Pre-Measured Target-Cancellation Filters," International Conference on Acoustics, Speech, and Signal Processing, 2013, pp. 679-683.

Allen, et al., "Image method for efficiently simulating small-room acoustics," Journal of the Acoustical Society of America, vol. 65, Issue No. 4, Apr. 1979, pp. 943-950.

Brueckmann R et al: "Adaptive Noise Reduction and Voice Activity Detection for improved Verbal Human-Robot Interaction using

(56) References Cited

OTHER PUBLICATIONS

Binaural Data". 2007 IEEE International Conference on Robotics and Automation, Roma, Italy, Apr. 10-14, 2007, pp. 1782-1787, XP031389051, (6 pages total).

Dvorkind, et al., "Time difference of arrival estimation of speech source in a noisy and reverberant environment" Signal processing, vol. 85, 2005, pp. 177-204.

Martin, R., "Noise Power Spectral Density Estimation Based on Optimal Smoothing and Minimum Statistics", IEEE Transactions on Speech and Audio processing, vol. 9, Jul. 2001, pp. 504-512.

Nelke, et al., "Dual Microphone Noise PSD Estimation for Mobile Phones in Hands-Free Position. Exploiting the Coherence and Speech Presence Probability", International Conference on Acoustics, Speech and Signal Processing, May 2013, Vancouver, Canada, 5 pages total.

Communication dated Sep. 25, 2020, issued by the Korean Intellectual Property Office in corresponding Korean Application No. 10-2014-0063112.

Communication dated Nov. 9, 2020, from the European Patent Office in counterpart European Application No. 14807150.9.

Communication dated Dec. 4, 2020, from the European Patent Office in counterpart European Application No. 14807150.9.

\* cited by examiner

SPEECH ENHANCEMENT METHOD AND APPARATUS FOR SAME

CROSS-REFERENCE TO RELATED APPLICATIONS

This is a continuation application of U.S. patent application Ser. No. 16/287,749, filed Feb. 27, 2019, in the U.S. Patent and Trademark Office, which is a continuation application of U.S. patent application Ser. No. 14/895,808 filed on Dec. 3, 2015, in the United States Patent and Trademark Office, which is a national stage application of PCT/KR2014/004840 filed on May 30, 2014, in the United States Patent and Trademark Office, which claims priority from U.S. Provisional Application No. 61/830,310 filed on Jun. 3, 2013, and U.S. Provisional Application No. 61/875,200 filed on Sep. 9, 2013, in the United States Patent and Trademark Office, and priority from Korean Patent Application No. 10-2014-0063112 filed on May 26, 2014, in the Korean Intellectual Property Office, the disclosures of which are incorporated herein by reference in their entireties.

BACKGROUND

1. Field

Apparatuses and methods consistent with exemplary embodiments relate to speech enhancement using a single or multiple microphones, and more particularly, to speech enhancement that applies a speech detection technique and a speaker direction detection technique.

2. Description of Related Art

A speech recognition technique is a technique in which a speech signal input by a user or the like is recognized as a signal corresponding to a predetermined language. The speech recognition technique may be used, for example, in controlling an operation of a predetermined electronic device such as a speech recognition navigation device, mobile phone, or television.

A speech enhancement technique which extracts a pure speech signal by removing noise mixed in an input speech signal may be used to improve a recognition rate when speech recognition is performed.

SUMMARY

One or more exemplary embodiments provide a method of using a speaker's utterance section and position information in speech enhancement to remove noise. In addition, one or more exemplary embodiments provide a speech enhancement method based on direction information, wherein estimation of directions based on speech detection information and a speech enhancement control technique are used.

According to an aspect of an exemplary embodiment, there is provided a speech enhancement apparatus comprising: a sensor unit comprising at least one microphone; a speech detection unit for detecting speech of a speaker by using a signal of the sensor unit; a direction estimation unit for estimating a direction of the speaker by using a signal of the sensor unit and generating direction information indicating the estimated direction; and a speech enhancement unit for enhancing the speech of the speaker that is input to the at least one microphone, wherein the speech detection unit controls operations of the direction estimation unit and the speech enhancement unit based on a result of the detecting speech by using the speech detection unit, and the direction estimation unit transmits the direction information to the speech enhancement unit.

According to an aspect of an exemplary embodiment, there is provided a speech enhancement apparatus including: a sensor comprising at least one microphone; a speech detector configured to detect speech of a speaker based on a signal of the sensor; a direction estimator configured to estimate a direction of the speaker based on the signal of the sensor and to generate direction information indicating the estimated direction; and a speech enhancer configured to enhance the speech of the speaker that is received by the microphone, wherein the speech detector is configured to control operations of the direction estimator and the speech enhancer based on whether speech is detected by the speech detector, and wherein the direction estimator transmits the direction information to the speech enhancer.

According to an aspect of an exemplary embodiment, there is provided a speech enhancement apparatus including: a sensor comprising at least one microphone; a speech detector configured to detect speech of a speaker based on a signal of the sensor; a direction estimator configured to estimate a direction of the speaker based on the signal of the sensor and to generate direction information indicating the estimated direction; and a speech enhancer configured to enhance the speech of the speaker that is received by the microphone, wherein the direction estimator is configured to control an operation of the speech detector based on a direction of the speaker estimated by the direction estimator and to transmit the direction information to the speech enhancer, and the speech detector is configured to control an operation of the speech enhancer based on whether speech is detected by the speech detector.

The sensor unit may further include at least one of a camera, and a bone conduction sensor, wherein the speech detector is further configured to detect whether there is a speech component by using a signal of the at least one microphone, detect movement of the lips of a speaker by using a signal of the camera, detect whether a speaker has spoken by using a signal of the bone conduction sensor, or detect speech by combining at least two of the at least one microphone, the camera, and the bone conduction sensor.

The sensor may further include at least one selected from at least two microphones and a camera, and wherein the direction estimator may be further configured to estimate a direction by using a difference between signals of the at least two microphones, recognizing a face of a speaker, or detecting movement of the lips of the speaker by using an image of the camera.

The speech enhancer may further include at least one filter, and in response to the speech detector detecting speech, a factor of the at least one filter is updated, and in response to the speech detector not detecting speech, noise for noise modeling is estimated.

The speech enhancer may use direction information received from the direction estimator to perform at least one of adjustment of time when a desired signal source arrives at each microphone, correction of a deviation between microphones, and separation of signal source.

The sensor unit may include at least one of a microphone, a camera, a bone conduction sensor, a proximity sensor, an infrared sensor, an acceleration sensor, or an ultrasonic sensor.

The direction estimator may be switched on and off based on a result of the detecting of speech. The speech detector may be switched on or off based on a result of the estimating of a direction.

According to an aspect of an exemplary embodiment, there is provided a speech enhancement method including: detecting a speech of a speaker; estimating a direction of the speaker based on a result of the detecting of speech and generating direction information indicating the estimated direction; and enhancing the speech of the speaker by using the direction information.

According to an aspect of an exemplary embodiment, there is provided a speech enhancement method including: estimating a direction of a speaker by using an input signal and generating direction information indicating the estimated direction; detecting a speech of a speaker based on a result of the estimating the direction; and enhancing the speech of the speaker by using the direction information based on a result of the detecting the speech.

The sensor unit may include at least one of a microphone, a camera, and a bone conduction sensor, wherein the speech detection unit detects whether there is a speech component by using a signal of the at least one microphone, detects movement of the lips of a speaker by using a signal of the camera, detects whether a speaker has spoken by using a signal of the bone conduction sensor, or detects speech by combining at least two of the at least one microphone, the camera, and the bone conduction sensor.

According to another aspect of an exemplary embodiment, there is provided a computer-readable recording medium having embodied thereon a program for executing the speech enhancement method according to an exemplary embodiment.

Accordingly, one or more exemplary embodiments relate to a speech enhancement technique in which a direction of a user is found when the user speaks. The speech enhancement technique works differently in a speech section and a non-speech section, and thus is efficient and ensures high performance. The exemplary embodiments may be applied not only to mobile phones but also to TVs, tablets, or hearing aids. In particular, human body-attached computing devices such as watches, rings, or glasses (wearable computers or wearable devices) have recently been getting attention gradually and are produced as products. If exemplary embodiments are combined with these wearable computing or wearable devices, an efficient low-power algorithm may be provided.

DETAILED DESCRIPTION OF THE EMBODIMENTS

Figure 1:
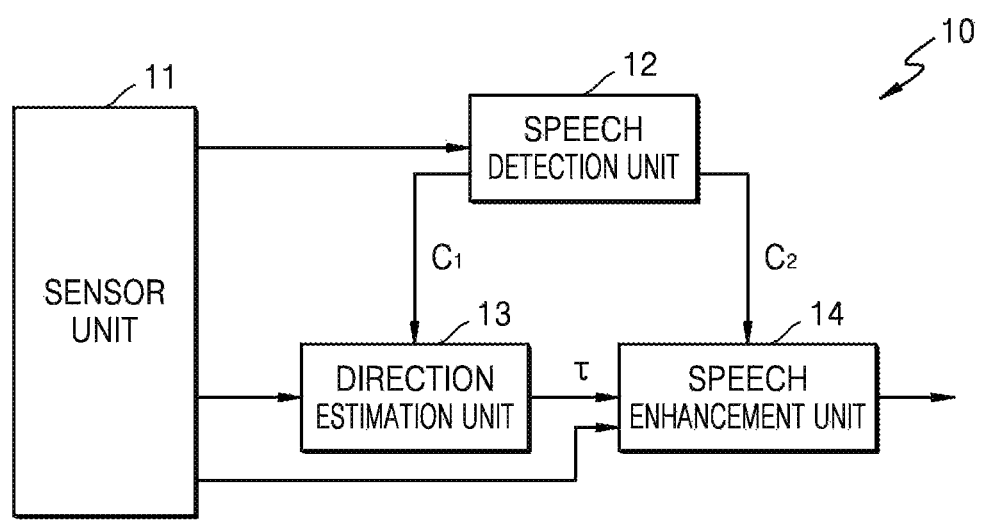
FIG. 1 is a schematic block diagram of a speech enhancement apparatus according to an exemplary embodiment.

The advantages and features of the inventive concept and methods of achieving the advantages and features will be described more fully with reference to the accompanying drawings, in which exemplary embodiments of the inventive concept are shown. The inventive concept may, however, be embodied in many different forms and should not be construed as being limited to the exemplary embodiments set forth herein; rather these exemplary embodiments are provided so that this disclosure will be thorough and complete, and will fully convey the concept of the inventive concept to one of ordinary skill in the art.

Hereinafter, the terms used in the specification will be briefly described, and then the inventive concept will be described in detail.

The terms used in this specification are those general terms currently widely used in the art in consideration of functions in regard to the inventive concept, but the terms may vary according to the intention of those of ordinary skill in the art, precedents, or new technology in the art. Moreover, specified terms may be selected by the applicant, and in this case, the detailed meaning thereof will be described in the detailed description of the inventive concept. Thus, the terms used in the specification should be understood not as simple names but based on the meaning of the terms and the overall description of the inventive concept.

Throughout the specification, it will also be understood that when a component "includes" an element, unless there is another opposite description thereto, it should be understood that the component does not exclude another element but may further include another element. In addition, terms such as a " . . . unit" used in the specification refers to a hardware component such as software or hardware component such as FPGA or ASIC, and a " . . . unit" performs certain functions. However, a " . . . unit" is not limited to software or hardware. A " . . . unit" may be configured in an addressable storage medium or to reproduce one or more processors. Thus, for example, a " . . . unit" includes components such as software components, object-oriented software components, class components, task components, processes, functions, attributes, procedures, subroutines, segments of programs codes, drivers, firmware, microcodes, circuits, data, databases, data structures, tables, arrays, and variables. Functions provided in the components and the " . . . units" may be combined with a smaller number of components and " . . . units" or separated from additional components and " . . . units."

Hereinafter, the inventive concept will now be described more fully with reference to the accompanying drawings, in which exemplary embodiments are shown such that one of ordinary skill in the art may easily understand the inventive concept. Details that are not related to description of the inventive concept will be omitted for clarity of description.

A user wishes to use a device regardless of where and in what posture the device is. Exemplary embodiments of the inventive concept are needed to apply a speech enhancement technique using microphones, to actual devices. Exemplary embodiments of the inventive concept relate to the enhancement of speech by searching for a direction of a user at the moment when the user speaks.

FIG. 1 is a block diagram of a speech enhancement apparatus 10 according to an exemplary embodiment.

Referring to FIG. 1, the speech enhancement apparatus 10 includes a sensor unit 11 (e.g., a sensor, etc.), a speech detection unit 12 (e.g., a speech detector, etc.), a direction estimation unit 13 (e.g., a direction estimator, etc.), and a speech enhancement unit 14 (e.g., a speech enhancer, etc.).

The sensor unit 11 includes at least one microphone. The sensor unit 11 may further include a camera, a bone conduction sensor, a proximity sensor, an infrared sensor, an acceleration sensor, or an ultrasonic sensor in addition to the at least one microphone.

The speech detection (SD) unit 12 detects speech of a speaker by using a signal of the sensor unit 11. For example, the speech detection unit 12 detects whether a user has spoken by using a microphone or other sensors.

The direction estimation unit 13 (target direction estimation (TDE) estimates a direction of a speaker by using a signal of the sensor unit 11 and generates direction information indicating the estimated direction. For example, the direction estimation unit 13 detects a position of a user by using multiple microphones or an image of a camera.

The speech enhancement (ENH) unit 14 enhances speech of a speaker that is input to a microphone. In detail, the speech enhancement unit 14 receives information indicating whether the user has spoken and direction information, and enhances a speech signal by using the information indicating whether the user has spoken and the direction information.

The speech detection unit 12 controls operations of the direction estimation unit 13 and the speech enhancement unit 14 based on a result of speech detection. Control information C1 transmitted from the speech detection unit 12 to the direction estimation unit 13 may be used to control switching the direction estimation unit 13 on or off. Control information C2 transmitted from the speech detection unit 12 to the speech enhancement unit 14 may control a filter update of the speech enhancement unit 14.

The direction estimation unit 13 transmits direction information to the speech enhancement unit 14. Information T transmitted from the direction estimation unit 13 to the speech enhancement unit 14 denotes direction information of a user.

As an input transmitted from the sensor unit 11 to the speech detection unit 12, a camera or bone conduction information may be used besides a microphone signal. As an input transmitted from the sensor unit 11 to the direction estimation unit 13, camera sensor information may be used in addition to a microphone signal. An input transmitted from the sensor unit 11 to the speech enhancement unit 14 may be a microphone signal.

Examples of methods of detecting speech by using the speech detection unit 12 include detecting whether there is a speech component by using a microphone signal, detecting movement of the lips of a speaker by using a camera signal in addition to voice activity detection (VAD) in which speech is used, detecting whether a speaker has spoken by using a bone conduction signal, and detecting speech in a multimodal manner in which the above methods are combined.

Examples of estimating a direction of speech by using the direction estimation unit 13 include estimating a direction by using a difference between two or more microphone signals, estimating a direction of arrival (DOA) or time difference of arrival (TDOA) using a speech, recognition of a face of a speaker, detecting movement of the lips of a speaker, recognition of gestures, or in a multimodal manner in which these methods are combined.

The speech enhancement unit 14 may include at least one filter. When speech is detected by the speech detection unit 12, a filter factor is counted, and when no speech is detected by the speech detection unit 12, noise for noise modeling may be estimated. The speech enhancement unit 14 may use direction information received from the direction estimation unit 13 to perform at least one of adjustment of time when a desired signal source arrives at each microphone, correction of a deviation between microphones, and separation of signal sources.

The speech enhancement apparatus 10 may operate also as follows. When a user speaks while a speech recognition mode or a call mode is prepared, the speech detection unit 12 detects the speech. In a section in which an utterance of the user is detected, the speech detection unit 12 turns on the direction estimation unit 13 by using the control information $C_1$ to search for a direction of the user while the user is speaking, and transmits the direction information T to the speech enhancement unit 14. Here, filter update of the speech enhancement unit 14 may be blocked to prevent speech distortion. The speech enhancement unit 14 corrects a delay between channels by using the received direction information T, and performs speech enhancement by adjusting a filter update by using the control information $C_2$.

According to the speech enhancement apparatus 10, the direction estimation unit 13 searches for a direction of the user only when the speech detection unit 12 detects speech, and thus, an exact direction of the user may be determined. If a direction is searched for while no speech has been uttered, an inaccurate direction may be estimated due to noise or the like. The speech enhancement unit 14 may perform speech enhancement by using exact direction information. Thus, by using the speech enhancement apparatus 10, speech enhancement performance by using direction estimation performance and direction information may be improved. Moreover, if speech is not detected, operations of the direction estimation unit 13 and the speech enhancement unit 14 may be stopped, and thus, a gain may be obtained also for computing power of the speech enhancement apparatus 10.

Figure 2:
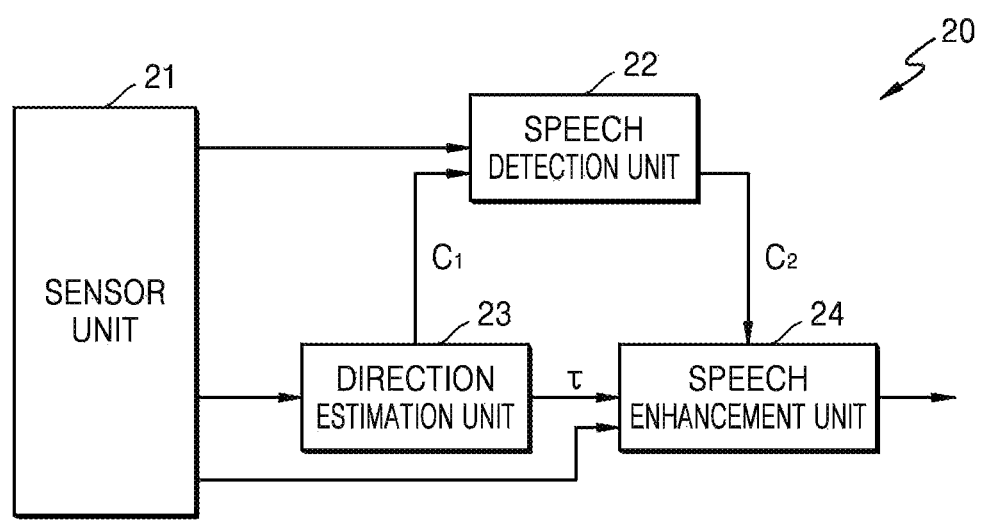
FIG. 2 is a schematic block diagram of a speech enhancement apparatus according to another exemplary embodiment.

FIG. 2 is a schematic block diagram of a speech enhancement apparatus 20 according to another exemplary embodiment.

Referring to FIG. 2, a sensor unit 21, a speech detection unit 22, a direction estimation unit 23, and a speech enhancement unit 24 of the speech enhancement apparatus 20 are similar to the sensor unit 11, the speech detection unit 12, the direction estimation unit 13, and the speech enhancement unit 14 of the speech enhancement apparatus 10 of FIG. 1, respectively. Hereinafter, description will focus on differences of the speech enhancement apparatus 20 from the speech enhancement apparatus 10.

Structures of the speech detection unit 22 and the direction estimation unit 23 of the speech enhancement apparatus 20 are different from those of the speech detection unit 12 and the direction estimation unit 13 of the speech enhancement apparatus 10. In detail, directions of control information $C_1$ are opposite in the speech enhancement apparatus 10 and the speech enhancement apparatus 20.

The direction estimation unit 23 controls an operation of the speech detection unit 22 based on a result of direction estimation. Control information $C_1$ transmitted from the direction estimation unit 23 to the speech detection unit 22 may be used to control switching the speech detection unit 22 on or off.

According to the speech enhancement apparatus 20, a direction may be first estimated to selectively process speech related to an operation of the speech enhancement apparatus 20 among detected speeches. For example, not only speech of a speaker to be input to a wearable device but daily conversation of the speaker may also be continuously input to a wearable device which is in the form of a watch. Here, the daily conversion of the speaker is highly likely not to be related to an operation of the wearable device. Speech of a speaker related to an operation of the wearable device is highly likely to be speech of the speaker while viewing a screen of the wearable device. Thus, according to the speech enhancement apparatus 20, if the direction estimation unit 23 estimates a direction of a speaker, based on camera sensor information or the like, that is, if the speaker is viewing a screen of the wearable device, the speech detection unit 22 detects speech so as to select speech that is highly related to use of the speech enhancement apparatus 20. Further, if no direction is estimated, operations of the speech enhancement unit 23 and the speech enhancement unit 24 may be stopped, and thus, a gain may be obtained also for computing power of the speech enhancement apparatus 20.

Examples of speech enhancement-related techniques may include beamforming whereby speech in a predetermined direction is focused and ambient noise is removed and noise suppression whereby stationary noise is removed.

Hereinafter, exemplary embodiments of a speech enhancement method according to exemplary embodiments of the inventive concept will be described with reference to FIGS. 3 and 4.

Figure 3:
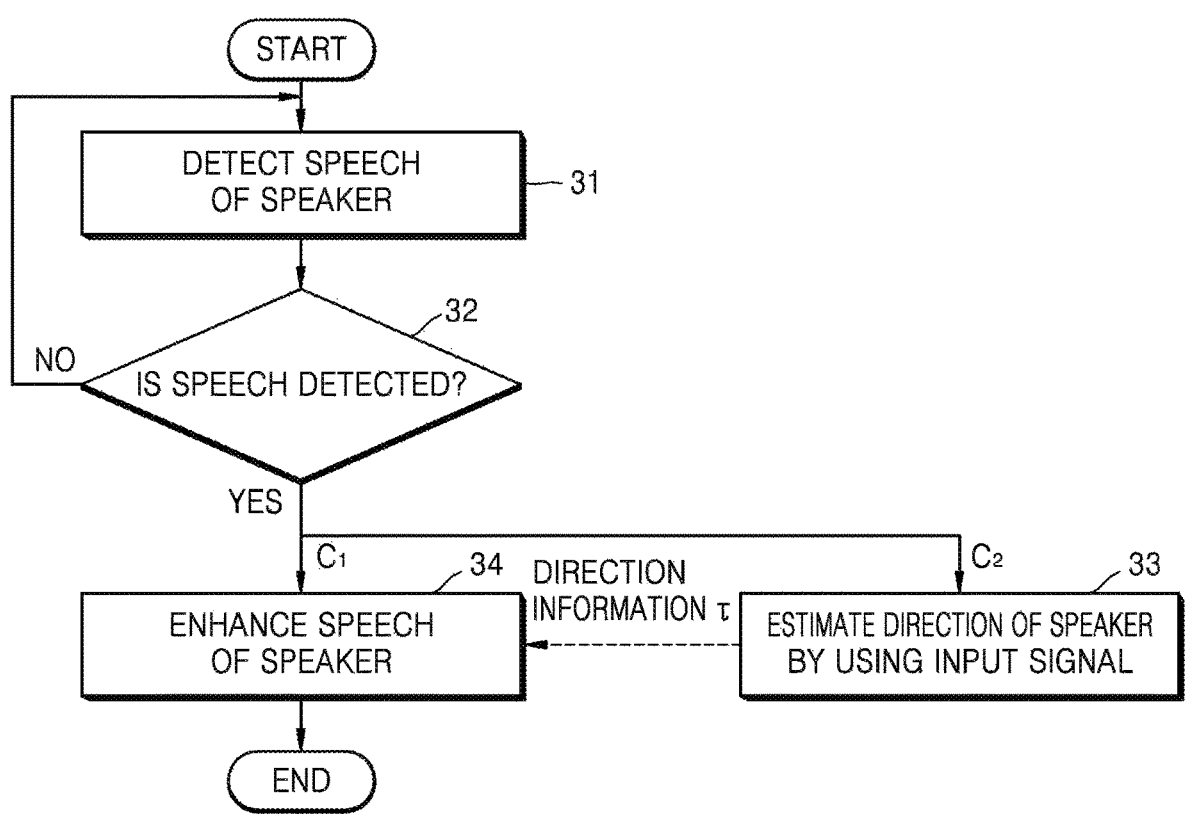
FIG. 3 is a flowchart of a speech enhancement method according to an exemplary embodiment.

FIG. 3 is a flowchart of a speech enhancement method according to an exemplary embodiment.

In operation 31, speech of a speaker is detected.

In operation 32, whether speech is detected or not is determined. If it is determined that speech is not detected (NO), the method returns to operation 31.

In operation 32, if it is determined that speech is detected (YES), a direction of a speaker is estimated by using an input signal in operation 33 and direction information T indicating the estimated direction is generated.

In operation 32, if it is determined that speech is detected (YES), in operation 34, the speech of the speaker is enhanced by using the direction information T of operation 33.

Thus, according to the speech enhancement method of FIG. 3, a direction is searched for only when speech is detected, and thus, a direction of the speaker may be determined. In addition, if it is determined that no speech is detected, direction estimation and speech enhancement may be omitted, and thus a gain may be obtained also for computing power.

Figure 4:
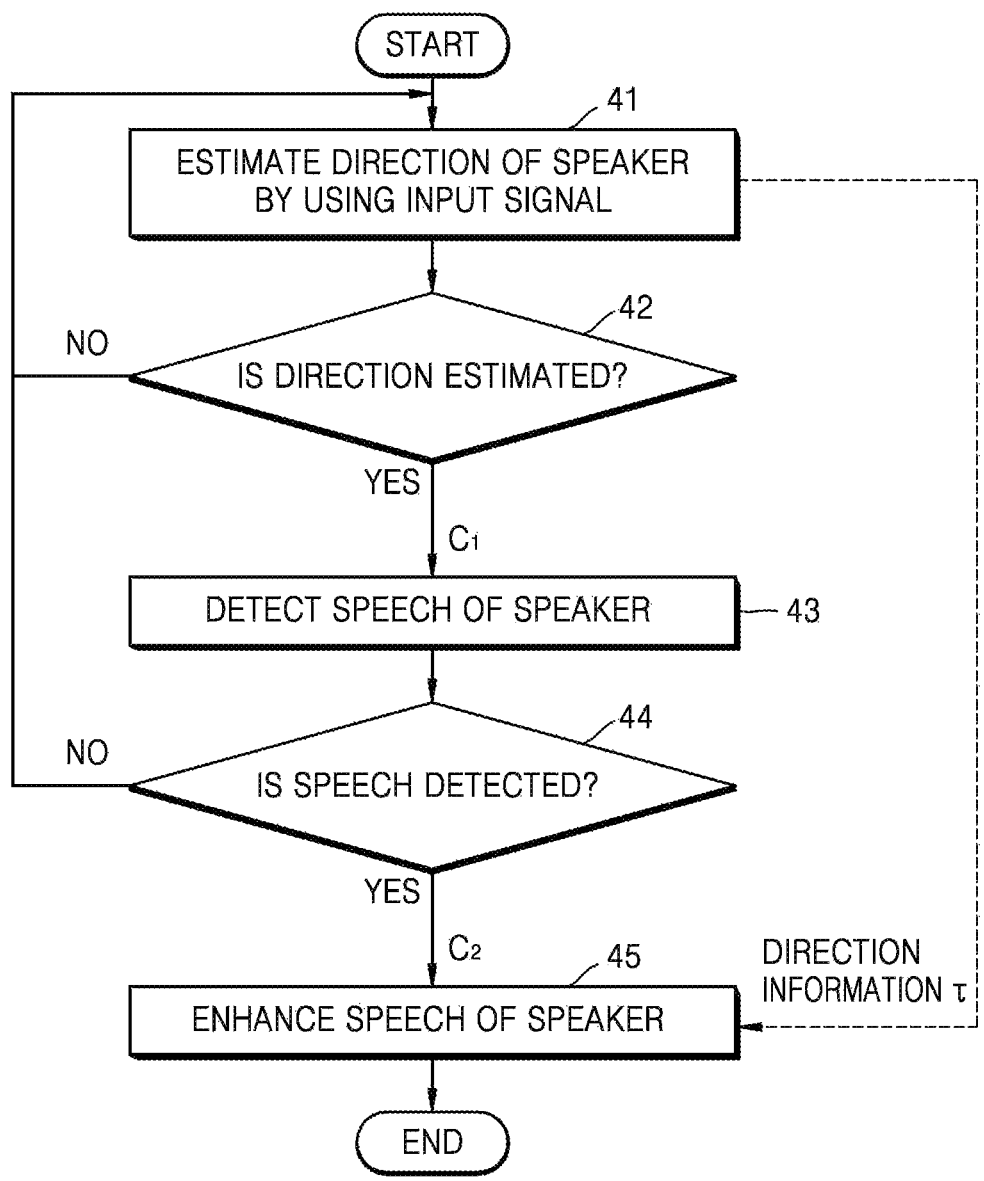
FIG. 4 is a flowchart of a speech enhancement method according to another exemplary embodiment.

FIG. 4 is a flowchart of a speech enhancement method according to another exemplary embodiment.

In operation 41, a direction of a speaker is estimated by using an input signal, and direction information indicating the estimated direction is generated.

In operation 42, whether a direction has been estimated or not is determined. If it is determined that no direction is estimated (when operation 42 corresponds to no), the method returns to operation 41.

In operation 42, if it is determined that a direction is estimated (when operation 42 corresponds to yes), speech of a speaker is detected in operation 43.

In operation 44, whether speech is detected or not is determined. If it is determined that no speech is detected (when operation 44 corresponds to no), the method returns to operation 41.

If it is determined that speech is detected (when operation 44 corresponds to yes), in operation 45, the speech of the speaker is enhanced by using direction information T of operation 41.

Thus, according to the speech enhancement method of FIG. 4, speech is detected if a direction of a speaker is able to be estimated, and thus, speech, which is highly likely to be used in speech enhancement, may be selected. Moreover, if no direction is estimated, speech detection and speech enhancement may be omitted, and thus, a gain may be also obtained for computing power.

Hereinafter, noise reduction in a speech enhancement apparatus according to an exemplary embodiment of the inventive concept will be described.

Stationary noise of a predetermined level (for example, a sine wave and white noise) is reproduced under situations where directions of speakers and noise directions are different. For example, a level of noise is assumed to be 10.

First, solution input and output are checked while there is no speech of a speaker. In this case, for example, an input signal noise level may be 10, and an output signal noise level may be about 8. Here, as speech of a speaker is not detected, direction estimation and speech enhancement are not performed; instead, noise modeling may be performed by using a speech enhancement unit.

Next, solution input and output after a speaker has spoken are checked. In this case, for example, an input single noise level may be 10, and an output signal noise level may be about 3. Here, as speech of a speaker is detected, direction estimation and speech enhancement are performed. As speech enhancement is performed by using direction information generated based on direction estimation, the speech enhancement may be focused on a speaker direction to concentrate more on the speech of the speaker, and an influence of a signal in a noise direction may be reduced, and accordingly, a noise level in an output signal is reduced.

Thus, according to the speech enhancement apparatus of an exemplary embodiment, even when noise of the same level is present and input before and after a speaker has spoken, there is a difference in output signal noise levels. When there is no speech of a speaker, noise of a predetermined level is output and thus noise modeling may be performed, and when there is speech of a speaker, a noise level is reduced and thus speech of a speaker may be enhanced.

Hereinafter, various exemplary embodiments in which a speech enhancement apparatus of the inventive concept is implemented in a device will be described with reference to FIGS. 5 through 9.

Figure 5:
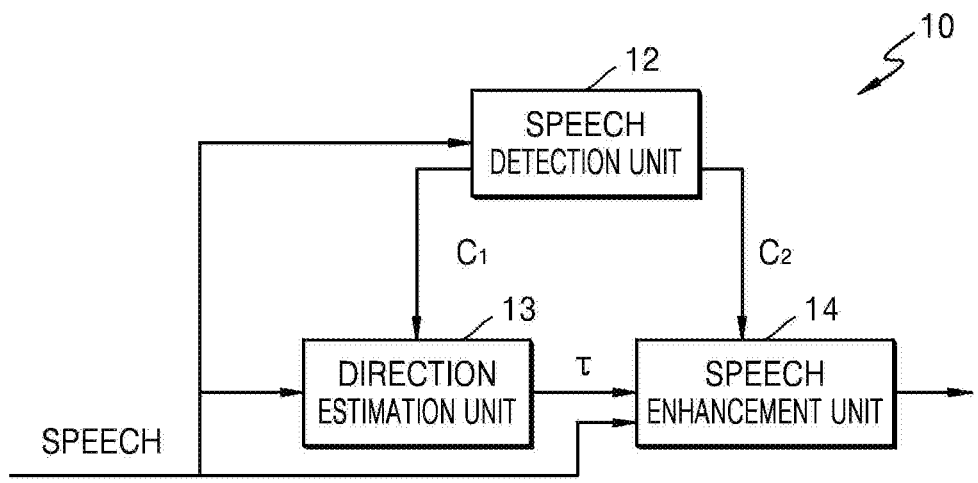
FIG. 5 illustrates a speech enhancement apparatus for mobile phone, according to an exemplary embodiment.
Figure 5:
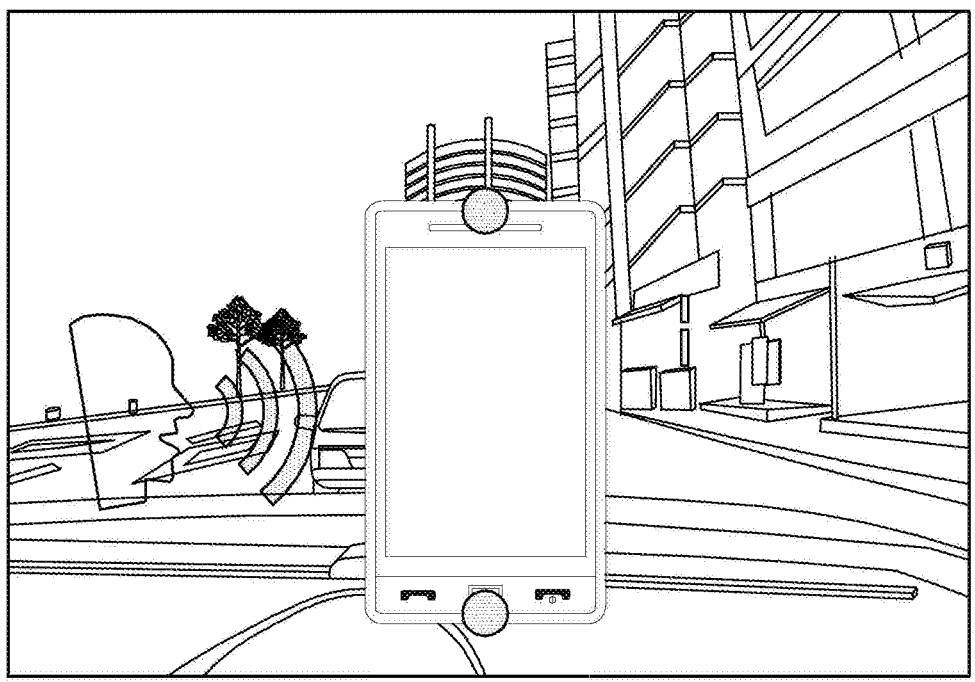

FIG. 5 illustrates a speech enhancement apparatus 10 for a mobile phone, according to an exemplary embodiment.

The speech enhancement apparatus 10 of FIG. 5 is substantially the same as the speech enhancement apparatus 10 of FIG. 1 having a basic block structure. In a mobile phone of FIG. 5, microphones may be located at positions marked with a shaded circle as ○. For example, microphones may be placed at an upper part and a lower part of the mobile phone. However, the positions and the number of microphones are not limited thereto, and microphones may be placed at other various positions. The speech detection unit 12 and the direction estimation unit 13 of the speech enhancement apparatus 10 for a mobile phone may use speech information of the microphones.

Figure 6:
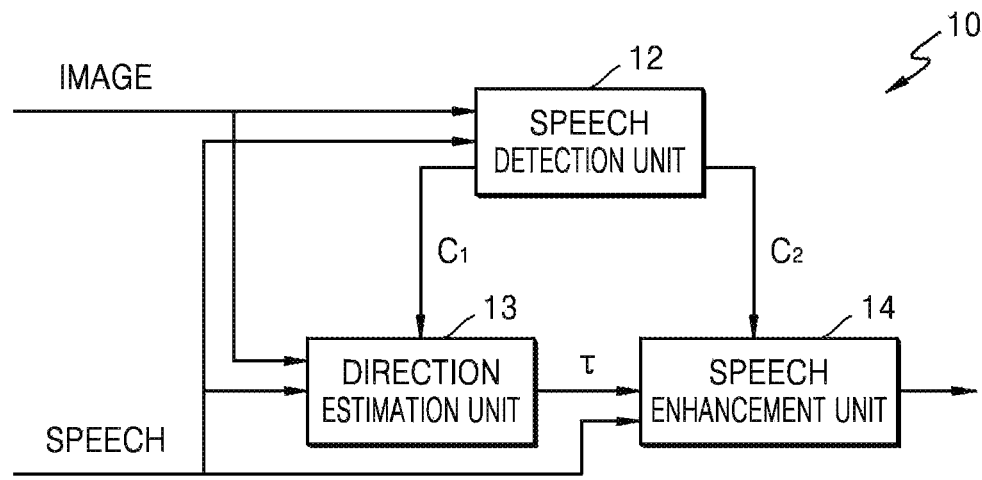
FIG. 6 illustrates a speech enhancement apparatus for a TV, according to an exemplary embodiment.
Figure 6:
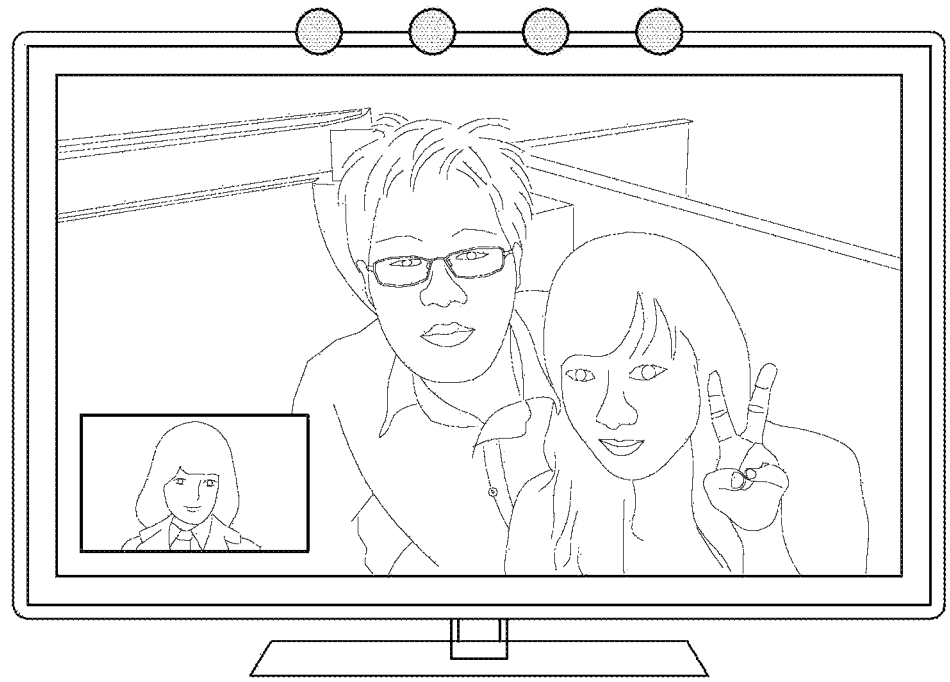

FIG. 6 illustrates a speech enhancement apparatus 10 for a TV, according to an exemplary embodiment.

In the example of a TV of FIG. 6, microphones may be located at positions marked with a shaded circle as ○. For example, microphones may be placed at an upper edge of the TV. However, the positions and the number of microphones are not limited thereto, and microphones may be placed at other various positions. Further, the TV may include a camera that is not shown. The TV may perform a multimedia function such as a video call function by using a microphone and a camera. A user may recognize speech or make a video call in front of the TV. Here, the speech detection unit 12 and the direction estimation unit 13 of the speech enhancement apparatus 10 for a TV may use both speech information and image information of the camera.

Figure 7:
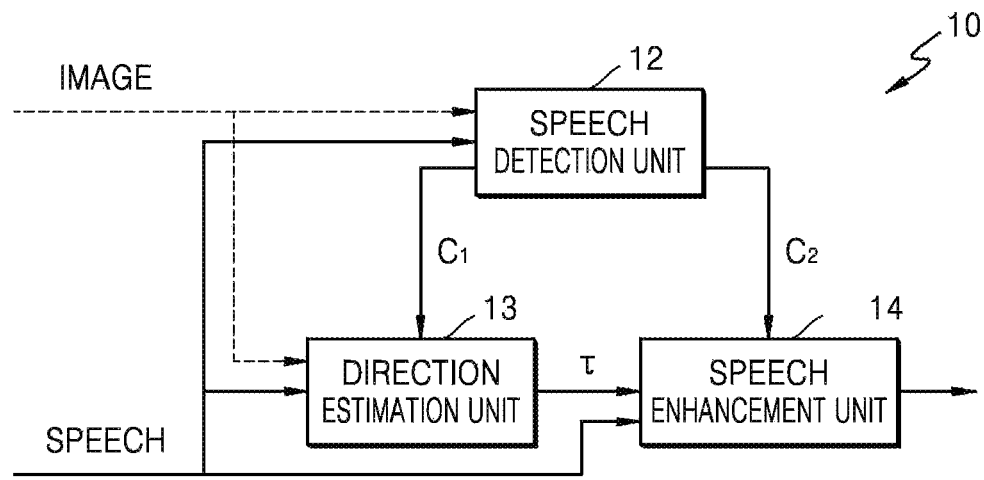
FIG. 7 illustrates a speech enhancement apparatus for a tablet, according to an exemplary embodiment.
Figure 7:

FIG. 7 illustrates a speech enhancement apparatus 10 for a tablet, according to an exemplary embodiment.

In the example of a tablet of FIG. 7, microphones may be located at positions marked with a shaded circle as ○. For example, microphones may be placed at a lower edge of a tablet. However, the positions and the number of microphones are not limited thereto, and microphones may be placed at other various positions. Usage behaviors of a tablet of a user vary, and thus a hybrid method according to usage behaviors may be selected. First, the speech detection unit 12 of the speech enhancement apparatus 10 for a tablet detects speech based on speech information. Next, if it is possible to perform face recognition based on camera information, like a scenario of a speech enhancement apparatus for TVs, the speech detection unit 12 and the direction estimation unit 13 of the speech enhancement apparatus 10 for a tablet may use both speech information and image information of a camera. If face recognition is not possible, like a scenario of a speech enhancement apparatus for mobile phones, the speech detection unit 12 and the direction estimation unit 13 of the speech enhancement apparatus 10 for a tablet may use speech information of the microphones.

Figure 8:
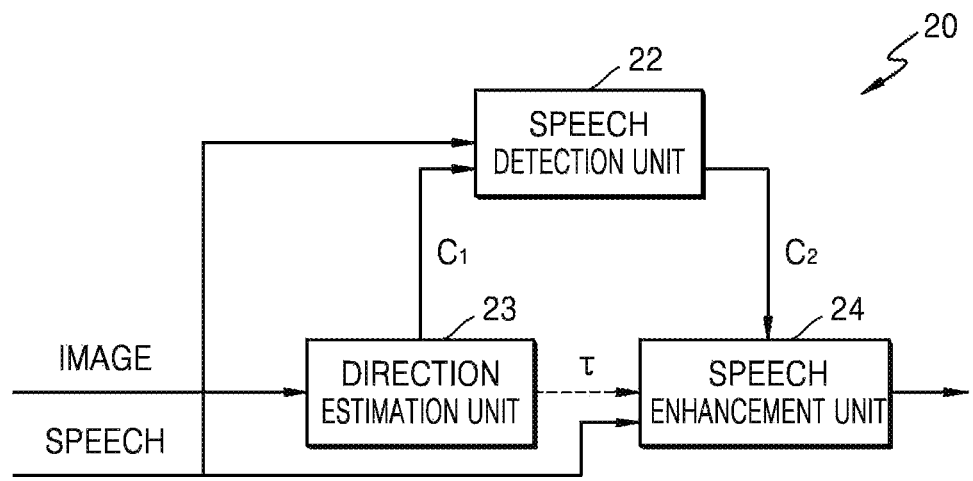
FIG. 8 illustrates a speech enhancement apparatus for a wearable device, according to another exemplary embodiment.
Figure 8:
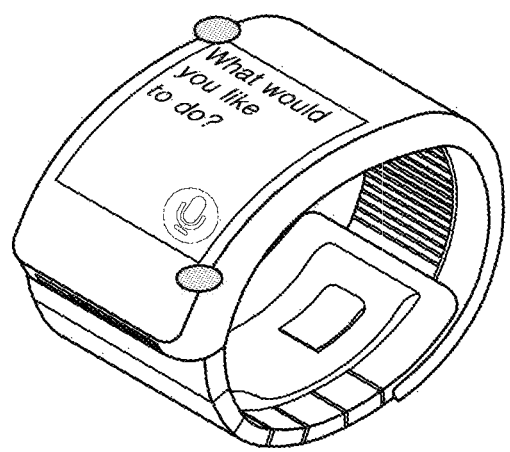

FIG. 8 illustrates a speech enhancement apparatus 20 for a wearable device according to another exemplary embodiment.

In the case of a wearable device, when a user is using a wearable device, face of the user usually faces the wearable device. When the face of the user is facing the wearable device, a recognition rate of speech of the user may be increased. That is, in the case of a wearable device, a speech detection efficiency may be further increased by setting a condition that a preprocessing operation is performed only when a face is recognized by using camera information. Thus, the speech enhancement apparatus 20 for a wearable device of FIG. 8 has almost the same structure as that of the speech enhancement apparatus 20 of FIG. 2 having a block structure. In the example of a wearable device of FIG. 8, microphones may be located at positions marked with a shaded circle as ○. For example, microphones may be placed at a left upper end and a right lower end of the wearable device. However, the positions and the number of microphones are not limited thereto, and microphones may be placed at other various positions.

The direction estimation unit 23 of the speech enhancement apparatus 20 for a wearable device notifies whether a face is recognized or not by using camera image information. Next, if a face is recognized, the speech detection unit 22 and the speech enhancement unit 24 operate. If a face is not recognized, the speech detection unit 22 and the speech enhancement unit 24 do not operate. If the wearable device has a single microphone, direction information T of the direction estimation unit 23 is not transmitted to the speech enhancement unit 24.

Figure 9:
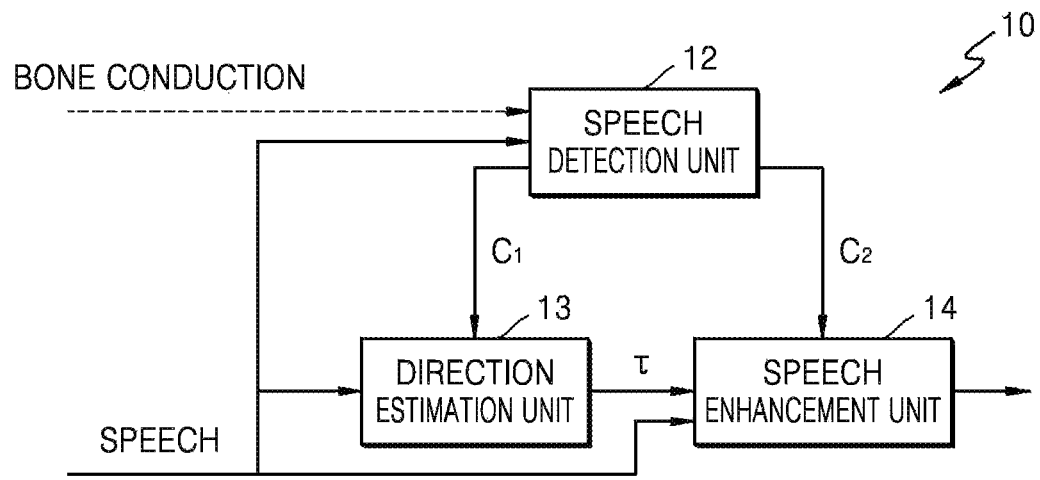
FIG. 9 illustrates a speech enhancement apparatus for a headset or hearing aid, according to an exemplary embodiment.
Figure 9:
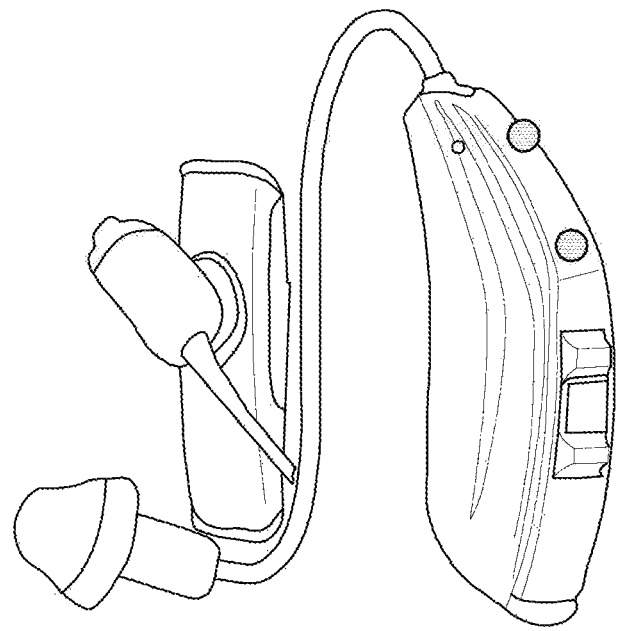

FIG. 9 illustrates a speech enhancement apparatus 10 for a headset or hearing aid, according to an exemplary embodiment.

When a user speaks, the speech is transmitted through the air but also through, for example, the skull of the user. To a headset that is directly worn on the head of a user or a hearing aid that is directly worn in the ears of a user, bone conduction that is transmitted via the skull of the user may be detected. Thus, the speech detection unit 12 of the speech enhancement apparatus for a headset or hearing aid may detect speech by using bone conduction sensor information in addition to speech information.

The inventive concept relates to a method of searching for a speaker direction at the moment when the user speaks to enhance a speech, wherein the method is a speech enhancement method that efficiently operates by distinguishing a speech section and a non-speech section and secures high performance. According to the inventive concept, the speech enhancement method may also be applied to TVs, tablets, or hearing aid besides mobile phones. In particular, body-attached type computing devices (wearable computer or wearable device) such as watches, rings, or glasses are gaining attention and appear in product forms in the industry, and if the method is combined with these devices, the method may contribute as an efficient low-power algorithm.

The inventive concept can also be embodied as computer readable codes on a computer readable recording medium. The computer readable recording medium is any recording device that can store data which can be thereafter read by a computer system.

Examples of the computer readable recording medium include read-only memory (ROM), random-access memory (RAM), CD-ROMs, magnetic tapes, floppy disks, optical data storage devices, etc. (such as data transmission through the Internet). The computer readable recording medium can also be distributed over network coupled computer systems so that the computer readable code is stored and executed in a distributed fashion. In addition, functional programs, codes, and code segments for accomplishing the inventive concept can be easily construed by programmers skilled in the art to which the inventive concept pertains.

While this inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. An electronic device comprising:
   a plurality of microphones disposed on an upper part of the electronic device;
   a processor configured to:
      receive at least one signal via any one or any combination of the plurality of microphones;
      estimate a direction of the received at least one signal;
      determine whether the estimated direction of the received at least one signal is a predetermined direction;

based on the estimated direction of the received at least one signal being determined to be the predetermined direction, determine whether the received at least one signal is associated with a speech of a user to control an operation of the electronic device;

based on the received at least one signal being determined to be associated with the speech of the user to control the operation of the electronic device, beamform the received at least one signal such that the received at least one signal from the predetermined direction is emphasized;

output beamformed at least one signal to perform speech recognition; and based on the estimated direction of the received at least one signal being determined to not be the predetermined direction, deactivate the determining whether the received at least one signal is associated with the speech of the user, the beamforming of the received at least one signal, and the outputting of the received at least one signal.

2. The electronic device of claim 1, wherein the electronic device further comprises a screen, wherein the processor is further configured to determine whether the estimated direction of the received at least one signal is the predetermined direction, based on a direction of the speech when the user speaks while viewing the screen of the electronic device.

3. A speech enhancement method being performed by an electronic device, the speech enhancement method comprising:

receiving at least one signal via any one or any combination of a plurality of microphones;

estimating a direction of the received at least one signal;

determining whether the estimated direction of the received at least one signal is a predetermined direction;

based on the estimated direction of the received at least one signal being determined to be the predetermined direction, determining whether the received at least one signal is associated with a speech of a user to control an operation of the electronic device;

based on the received at least one signal being determined to be associated with the speech of the user to control the operation of the electronic device, beamforming the received at least one signal such that the received at least one signal from the predetermined direction is emphasized;

outputting beamformed at least one signal to perform speech recognition; and based on that the estimated direction of the received at least one signal being determined to not be the predetermined direction, deactivating the determining whether the received at least one signal is associated with the speech of the user, the beamforming of the received at least one signal, and the outputting of the received at least one signal.

4. The electronic device of claim 3, wherein the determining whether the estimated direction of the received at least one signal is the predetermined direction is based on a direction of the speech when the user speaks while viewing a screen of the electronic device.

5. A non-transitory computer-readable storage medium storing instructions that cause a processor of an electronic device to:

receive at least one signal via any one or any combination of a plurality of microphones disposed on an upper part of the electronic device;

estimate a direction of the received least one signal;

determine whether the estimated direction of the received at least one signal is a predetermined direction;

based on the estimated direction of the received at least one signal being determined to be the predetermined direction, determine whether the received at least one signal is associated with a speech of a user to control an operation of the electronic device;

based on the received at least one signal being determined to be associated with the speech of the user to control the operation of the electronic device, beamform the received at least one signal such that the received at least one signal from the predetermined direction is emphasized;

output the beamformed at least one signal to perform speech recognition; and based on that the estimated direction of the received at least one signal being determined to not be the predetermined direction, deactivating the determining whether the received at least one signal is associated with the speech of the user, the beamforming of the received at least one signal, and the outputting of the received at least one signal.

* * * * *